Jan. 8, 1946.  W. P. LEAR  2,392,394
AIRCRAFT SIREN SYSTEM
Filed Feb. 21, 1942  4 Sheets-Sheet 1

INVENTOR
William P. Lear
BY
Richard A. Morse
ATTORNEY

Jan. 8, 1946. W. P. LEAR 2,392,394
AIRCRAFT SIREN SYSTEM
Filed Feb. 21, 1942 4 Sheets-Sheet 2

INVENTOR
William P. Lear
BY Richard A. Marsen
ATTORNEY

Jan. 8, 1946.    W. P. LEAR    2,392,394
AIRCRAFT SIREN SYSTEM
Filed Feb. 21, 1942    4 Sheets-Sheet 3

INVENTOR
William P. Lear
BY
Richard A. Marsen
ATTORNEY

Jan. 8, 1946. W. P. LEAR 2,392,394
AIRCRAFT SIREN SYSTEM
Filed Feb. 21, 1942 4 Sheets-Sheet 4

INVENTOR.
William P. Lear
BY
Richard A. Marsen
ATTORNEY

Patented Jan. 8, 1946

2,392,394

UNITED STATES PATENT OFFICE 2,392,394

AIRCRAFT SIREN SYSTEM

William P. Lear, Piqua, Ohio, assignor, by mesne assignments, to Lear, Incorporated, Piqua, Ohio, a corporation of Illinois Application February 21, 1942, Serial No. 431,814

7 Claims. (Cl. 244—1)

This invention relates to high intensity sound producing systems for aircraft.

In accordance with the present invention, sirens or similar sound producing devices are incorporated with an aircraft for operation by aerodynamic power generated during flight. The sirens are arranged so as to normally not interfere with the aerodynamic characteristics of the aircraft nor add any drag. When it is desired to operate the sirens to produce intense sounds, as for example during dive-bombing maneuvers, the tremendous aerodynamic forces associated with the aircraft in high-speed flight are utilized for the operation.

An important feature of the present invention resides in the utilization of a substantial portion of the aerodynamic power generated by an aircraft in flight to operate powerful sound producing means. When it is considered that a modern combat plane exerts thousands of horsepower in full flight condition, a considerable array of siren means can be driven by my invention without requiring auxiliary or stand-by power plant. In one arrangement, power used to operate the sirens is obtained from braking of the aircraft during a power dive, without interfering with the diving maneuvers. The invention is particularly directed to novel arrangements for incorporating an array of powerful sirens with the aircraft, and for readily operating them into the inactive and into the sound producing conditions.

The above and further advantages, capabilities and features of the present invention will appear in the following description of specific embodiments thereof illustrated in the accompanying drawings in which.

Figure 1:
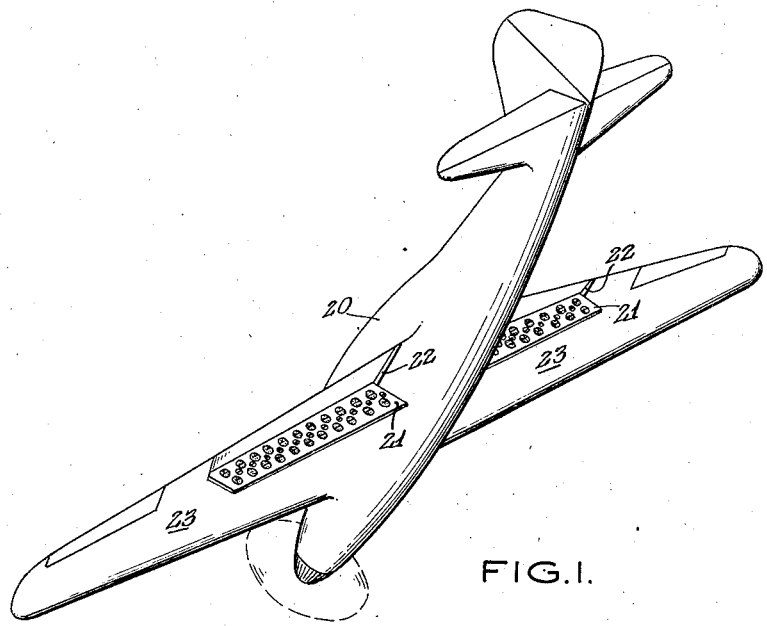
Fig. 1 is a perspective illustration of a combat plane in a diving maneuver with sirens incorporated in auxiliary or braking flaps.
Figure 2:
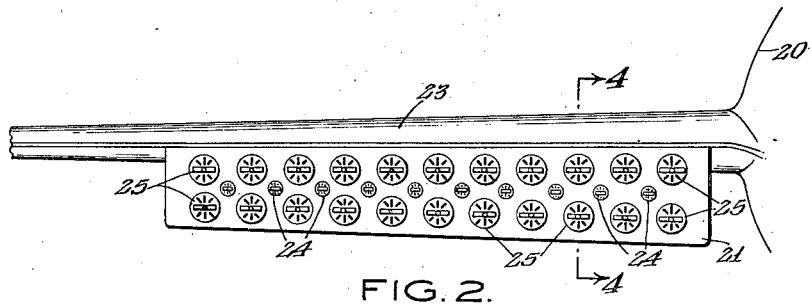
Figs. 2, 3 and 4 are detailed illustrations of the siren arrangement in the auxiliary wing flaps of the system shown in Fig. 1.

In the embodiment of Fig. 1, a plurality of relatively small diameter sirens are incorporated in a flap assembly of the aircraft. Aircraft 20 represents a combat plane, and for simplicity is shown with a single engine. Other aircraft types may of course be used. Aircraft 20 contains a pair of flaps 21, 21 which fit into and operate from corresponding recesses 22, 22 in the undersurface of wings 23, 23. Flaps 21, 21 are extended or retracted through a suitable remote control system under the direct control of the pilot, in a suitable manner known to those skilled in the aircraft art. In Figs. 1 and 2, flaps 21 are shown in the extended position; in Fig. 3, in the retracted position.

Flaps 21, 21 may be auxiliary ones for the specific purpose of producing the sound, or they may fundamentally be braking flaps. The flaps contain a series of openings or holes along their entire surfaces. In accordance with the form of the invention shown in Figs. 1 to 4, a number of sirens 24 and 25 are individually mounted in the openings of flaps 21. In the illustrated embodiment, the holes in flaps 21 are approximately of two sizes; 25 being the larger size, and 24 the smaller. It is however to be understood that the openings in flaps 21 may be of any suitable diameters, depending upon aerodynamic considerations. The diameter of the sirens fitted into the respective openings are proportioned to correspond therewith.

Figure 5:
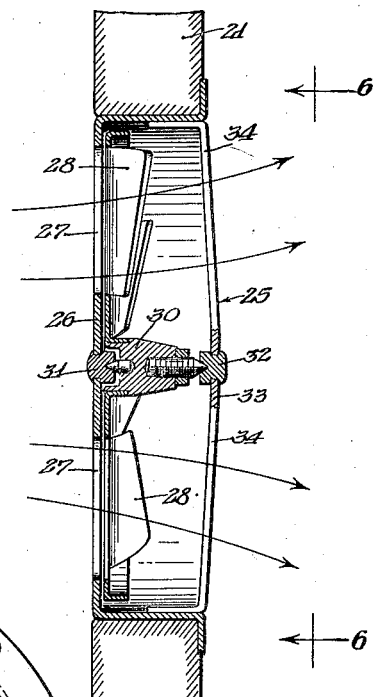
Figs. 5 and 6 are enlarged illustrations of a preferred form of air siren for the system of Figs. 1-4.
Figure 6:
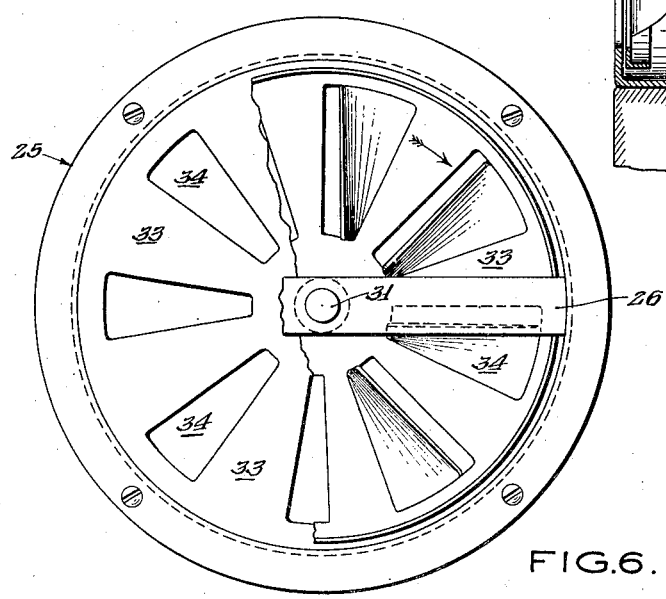

The sirens 24, 25 are of the air driven type. Figs. 5 and 6 are respectively cross-sectional and side views of a preferred siren construction. Front face 26 contains a series of openings 27 through which the air flows, as represented by the arrows in Figs. 4 and 5. This air flow occurs when the aircraft is in flight and flaps 21 are extended. The air flow through openings 27 impinges upon blades 28 of rotor 30. Rotor 30 is rotatably mounted between bushings 31, 32 respectively set in front face 26 and rear face 33 of the siren. The air impinging upon blades 28 causes rotor 30 to operate at a considerable angular velocity. The flat face of rotor 30 is parallel with and adjacent to front face 26 and its spaced openings 27. Turning of rotor 30 accordingly successively interrupts the air flow through the openings 27, producing the well known siren "air chopping" action. The air passes through the siren through the rear openings 34. The high speed interruption of the air flow through the siren generates the familiar siren sound, the pitch of which depends upon the speed of the rotor and the general design of the siren.

Figure 3:
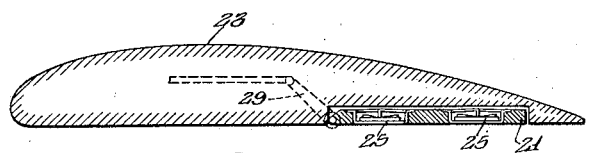
Figure 4:
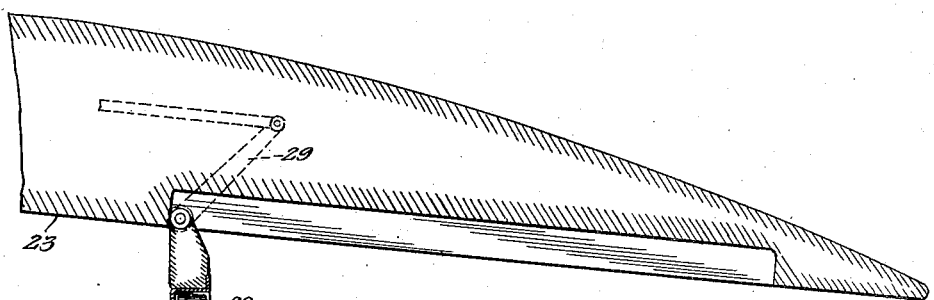

When the flaps 21 are in the retracted position, within wings 23, 23 as shown in Fig. 3, there is no air flow through the sirens and no sound is produced thereby. Since the sirens do not project from the surface of flaps 21, they do not interfere with the aerodynamic characteristics or maneuverability of the aircraft: Furthermore, since the sirens are of size and dimensions as to be directly incorporated with the flaps 21, there is no additional space requirement aboard the aircraft for them. The form of the invention illustrated in Figs. 1 to 4 is particularly useful for dive bombers which desire intense sounds during power driving; as during a power dive, the momentum of the aircraft represents thousands of horsepower. Since some braking action is generally utilized to control the aircraft in its dive bombing, particularly in the lower levels, no drain of driving energy is made in operating the sirens at that time. The pilot extends flaps 21, 21 from the retracted position of Fig. 3 to the extended position shown in Figs. 1, 2 and 4 by operating the corresponding control lever.

With flaps 21, 21 extended in a plane transverse to the axis of the aircraft, air at the tremendous wind velocity is forced through the front openings of the individual sirens 24, 25. The large number of sirens mounted on both wings are accordingly set into immediate and simultaneous operation, and generate an intense combined sound. If it is desired to have a single pitch generated, all the sirens are designed for that pitch. On the other hand, if a composite sound with several pitches is desired, then the corresponding frequencies are chosen for the installed sirens. For a terrifying and shrieking sound emission, sirens with a discordant combination of several pitches are used.

Figure 7:
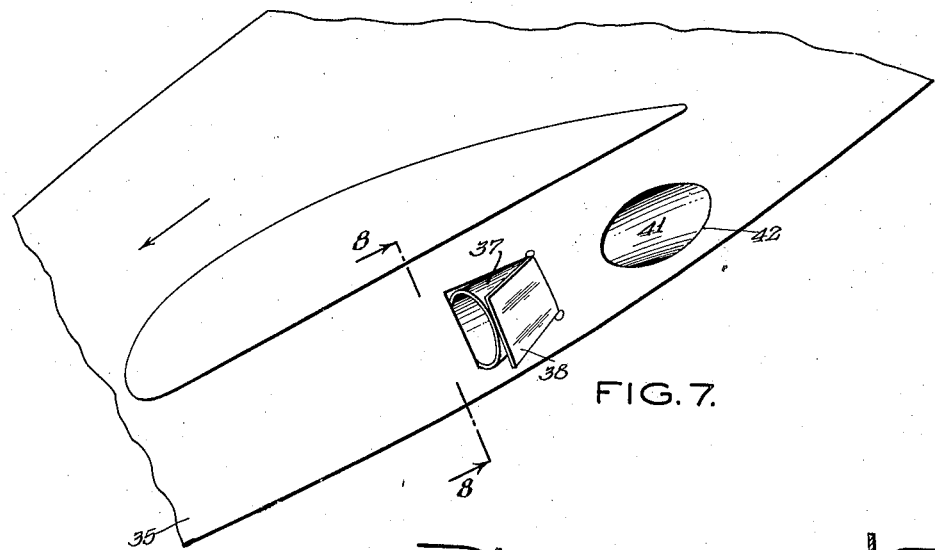
Fig. 7 is an elevational view of a modified form of the invention as applied to the fuselage of an aircraft.
Figure 8:
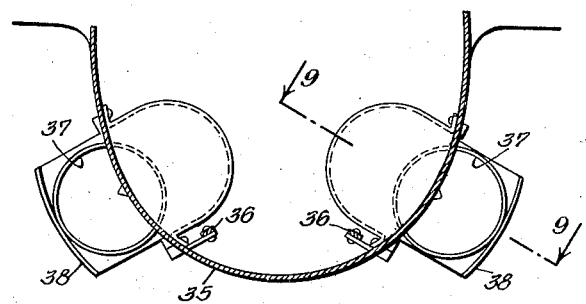
Fig. 8 is a cross-sectional view through the system of Fig. 7, as taken along the line 8—8 of Fig. 7.
Figure 9:
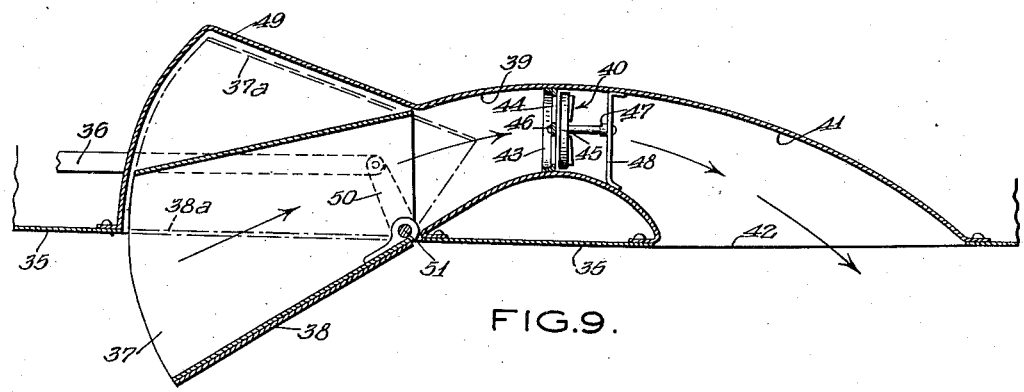
Fig. 9 is a longitudinal cross-sectional view through the siren system of Figs. 7 and 8, as taken along line 9—9 of Fig. 8.

Figs. 7, 8 and 9 show a modified form of the present invention. In this embodiment, the sirens are mounted within fuselage 35 of the aircraft. Two siren assemblies, one on each side of the lower portion of fuselage 35, are shown. This arrangement is such that, when it is in the inoperative condition, no aerodynamic resistance is added to the aircraft in flight. When it is desired to operate the sirens, suitable control levers 36 are motivated remotely by the pilot. Levers 36 are individually connected to a pivoted funnel intake section 37. An associated fuselage section 38 is pivoted with section 37 and both are extended by lever 36 through to the exterior of the aircraft, as shown in solid lines in the figures. The openings of funnel 37 converge to a central conduit section 39 which encloses a siren 40 at its region of smaller diameter. The conduit flares out from the siren section 39 as a section 41 which communicates with the exterior of the fuselage at opening 42.

The conduit arrangement 37, 39, 41 is generally in the shape of a Venturi tube, so that maximum air flow velocity exists at the siren 40 located at the narrow section. The walls of intake section 37 are aligned and substantially coextensive with the walls of central section 39 when section 37 is in the extended position illustrated. Intake section 37 scoops up and otherwise receives air at the high velocity of the aircraft in flight, and imparts the air in a substantially continuous and uninterrupted stream to the siren 40. The air thus drives the siren 40 and leaves through the rear channel section 41 to outside and towards the rear of the aircraft. The general air flow through the conduit is indicated by the series of arrows in Fig. 9.

The sirens 40 used are of suitable size and design for emitting the powerful sounds required, and at the desired pitch. While two siren assemblies are illustrated, it is to be understood that any other number may be instead employed, and that they are preferably interconnected to a common operating control. The front face of siren 40 is in the form of an annular face plate 43 attached to the corresponding circular minimum section of conduit 39. Face plate 43 has suitable spaced openings 44. A rotor 45 is arranged adjacent to plate 44. Rotor 45 is supported between bearing 46 in plate 43 and bearing 47 in a bracket 48 suitably secured to the conduit walls.

Rectangular windows 38 are essentially the sections of fuselage 35 which correspond to the respective openings required by the intake sections 37 in their extended position. Each window 38 is secured to its conduit section 37, along its central longitudinal region. Thus, when a section 37 is retracted as shown by the dotted line indication 37a in Fig. 9, window 38 is flush with fuselage 35 as shown by the dotted line 38a. Funnel 37 fits into a correspondingly shaped receptacle 49 joined with the forward edge of central section 39. Receptacle 49 is constructed so as to prevent air leakage from the conduit-siren arrangement into the interior of the fuselage. A bracket 50 extends from the hinge 51 of the pivotal mounting for the funnel section 37 in fuselage 35. Bracket 50 is coupled to link 36 for direct actuation of funnel section 37 between its extended and retracted positions.

Figures 10, 11:
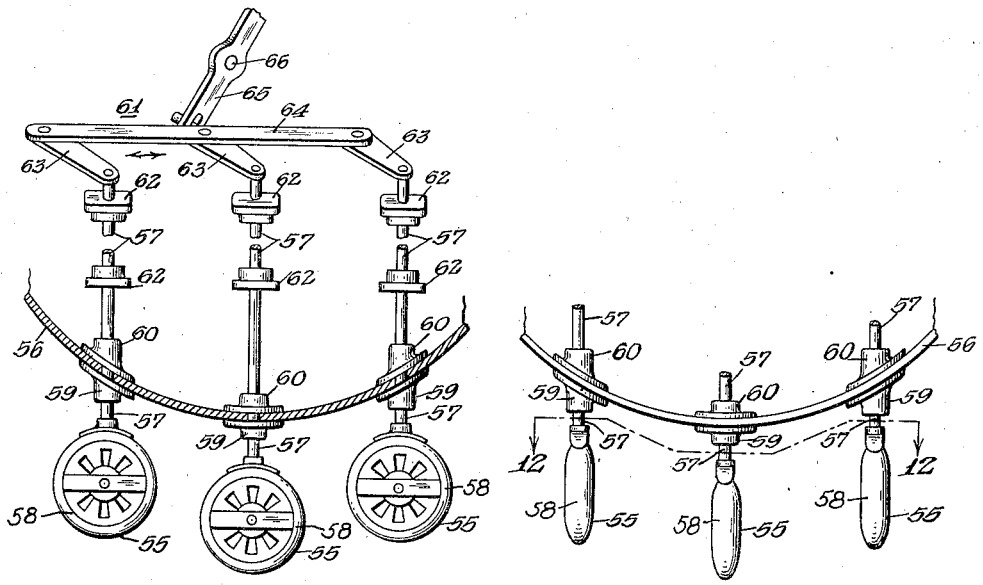
Figs. 10, 11 and 12 illustrate a further modification of the invention wherein the sirens are mounted externally of the aircraft.
Figure 12:
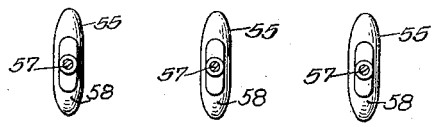

Figs. 10, 11 and 12 illustrate a form of the invention wherein the sirens remain on the exterior of the aircraft for both the inactive and the operative conditions. In Fig. 10, three sirens 55 are shown in their operative position. Sirens 55 extend below fuselage 56, suspended by individual rods 57. Air sirens 55 are generally of the construction previously described. Their outer frame 58 however is elongated, as shown in Figs. 11 and 12, to reduce the aerodynamic resistance by the sirens when in their inactive position, as will be described. Rods 57 extends into fuselage 56, and are supported in suitable bearings 59, 60 anchored on the fuselage. External bushings 59 are preferably elongated or streamlined in the direction of flight.

Siren control rods 57 extend to a common control mechanism 61, diagrammatically indicated in Fig. 10. Suitable bearings or bushings 62 are utilized to properly stabilize the torsional forces on rods 57. Links 63 extend from rods 57 and are pivotally linked to a connecting rod 64. A lever 65 is linked with rod 64 to shift it transversely for the control operations. Lever 65 is pivoted at 66 to effect the transverse movements of rod 64 and the corresponding angular movements of links 63 and rods 57. The operative and inoperative positions of sirens 55 are ninety mechanical degrees apart, as a comparison of their positions in Figs. 10 and 11 will show. By suitable shifting of lever 65, the sirens are moved from their transverse or sound producing position of Fig. 10, to their longitudinal or inoperative position of Fig. 11. The sirens 55 are constructed with as narrow a cross-section as is feasible, to reduce the projected area of the sirens when in their inactive or inoperative position. This feature, combined with their tear-drop shaped ends, reduces any aerodynamic drag of the sirens to a minimum, as will be understood by those skilled in the art.

Figures 13, 14:
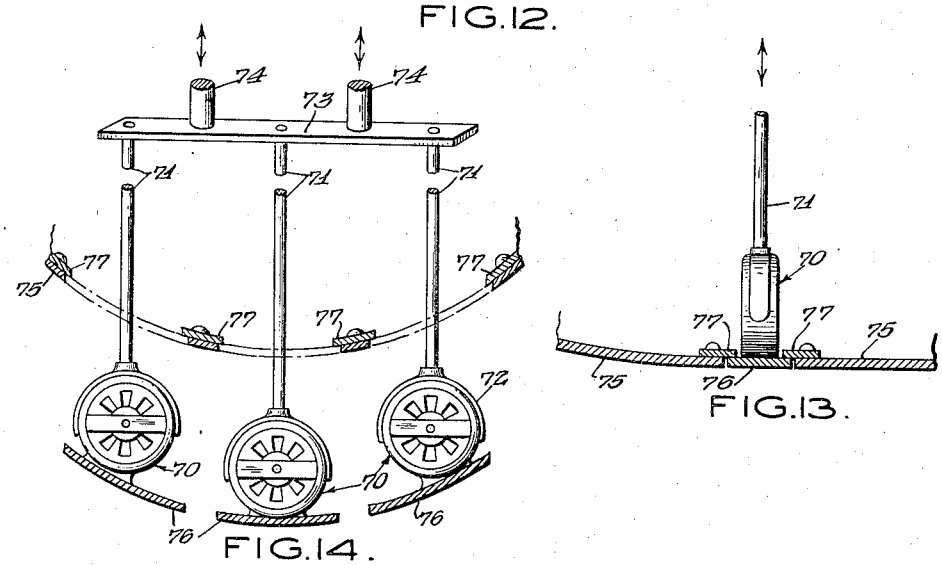
Figs. 13 and 14 illustrate a still further form of the invention.

A further form of the invention is illustrated in Figs. 13 and 14, wherein the sirens are extended for use but retracted within the body of the aircraft when not in use. The sirens 70 are supported from rods 71. Rods 71 are attached to the frames of sirens 70 through integral yokes 72. Rods 71 are connected to a common control mechanism, diagrammatically indicated in Fig. 14 by bar 73 and projecting rods 74, 74. The control mechanism 73—74 is designed to simultaneously lower the sirens 70 through the body of the aircraft, such as through fuselage 75, to their extended position. The sirens when thus extended are projected transverse of the flight direction, and receive the full impact of the air flow.

Rectangular shaped windows 76, corresponding to the openings in fuselage 75 for the respective sirens 70, are secured to the contiguous portions of the sirens. Thus, when the sirens are lowered, the windows 76 are carried with the sirens. Constructing the sirens relatively thin permits the width of the windows 76 to be correspondingly narrow, making for minimum sized openings in the fuselage. Lips or flanges 77 are arranged in the interior of the fuselage along the openings, to contact with the edges of windows 76 when in their retracted position. The openings are then sealed, with the windows 76 flush with the fuselage surface.

Although I have described and illustrated preferred embodiments for carrying out my present invention, it is to be understood that modifications may be made therein without departing from the broader spirit and scope of the invention as set forth in the appended claims.

What is claimed is:

1. The combination with an aircraft of a flap arranged in an aircraft wing, means for controllably extending said flap, and siren means incorporated in said flap, whereby braking energy exerted on said flap when extended during flight operates said siren means to produce sound.

2. The combination with an aircraft of a braking flap hingedly arranged in a recess of an aircraft wing, means for controllably extending said flap, and a plurality of air sirens mounted in openings of said flap, whereby braking energy exerted on said flap when extended during flight operates said sirens to produce sound and said sirens are not actuated when said flap is retracted within said recess.

3. The combination with an aircraft of flaps arranged in the aircraft wings, means for controllably extending said flaps, and sirens incorporated in said flaps, whereby braking energy exerted on said flaps when extended during flight operates said sirens to produce sound and said sirens are inoperative when said flaps are retracted within said recesses.

4. The combination with an aircraft of braking flaps hingedly arranged in a recess of each aircraft wing, means for controllably extending said flaps, and a plurality of air sirens of different pitch mounted in openings of said flaps, whereby braking energy exerted on said flaps when extended during flight operates said sirens to produce sound and said sirens are inoperative when said flaps are retracted within said wing recesses.

5. The combination with an aircraft of a pair of braking flaps each having a plurality of openings extending transversely therethrough, said flaps being hingedly arranged in recesses of the aircraft wing on either side of the fuselage, means for controllably extending said flaps, and a plurality of flat sirens mounted in the openings, said sirens being actuated to produce sounds when said flaps are extended to effect braking of the aircraft in flight, and being unactuated when said flaps are retracted within said recesses in normal flight.

6. The combination with an aircraft of a pair of braking flaps each having a plurality of openings extending transversely therethrough, said flaps being hingedly arranged in recesses of the aircraft wing on either side of the fuselage, means for controllably extending said flaps, and a plurality of siren means mounted in the openings, said sirens having faces substantially coextensive with the flap surfaces and forming partial continuations thereof to add substantially no aerodynamic resistance to said braking flaps when in retracted position.

7. The combination with an aircraft of a braking flap hingedly arranged in a recess of an aircraft wing, means for controllably extending said flap, and a plurality of air sirens mounted in openings of said flap, each siren including a rotor arranged to be rotatable in the plane of said flap, whereby braking energy exerted on said flap when extended during flight operates said rotors and produces sound, said rotors remaining stationary when said flap is retracted within said recess.

WILLIAM P. LEAR.